US000001111H

United States Statutory Invention Registration [19]

[11] Reg. Number: H1111

Dunn et al.

[43] Published: Nov. 3, 1992

[54] MOLD RELEASE TECHNIQUE FOR SOLID PROPELLANT CASTING TOOLING

[75] Inventors: William F. Dunn, Brigham City; Larry W. Poulter, Ogden, both of Utah

[73] Assignee: The United States of America as represented as the Secretary of the Air Force, Washington, D.C.

[21] Appl. No.: 678,386

[22] Filed: Apr. 1, 1991

[51] Int. Cl.[5] ..... B28B 7/36; B29C 33/56

[52] U.S. Cl. ..... 249/114.1; 249/115; 249/134; 264/3.1; 264/130; 264/219

[58] Field of Search ..... 249/114.1, 115, 134; 264/129, 130, 219, 3.1, 338

[56] References Cited

U.S. PATENT DOCUMENTS

| | | | |
|---|---|---|---|
| 3,466,204 | 9/1969 | Gow | 264/3.1 |
| 3,761,047 | 9/1973 | Mao | 249/115 |
| 3,870,578 | 3/1975 | Nichols | 149/19.4 |
| 4,004,523 | 1/1977 | Clifford et al. | 102/290 |
| 4,009,231 | 2/1977 | Wasserman et al. | 102/290 |
| 4,084,781 | 4/1978 | Couch et al. | 249/83 |
| 4,099,376 | 7/1978 | Japs | 60/253 |
| 4,197,800 | 4/1980 | Greever et al. | 102/38 RA |
| 4,284,592 | 8/1981 | Evans et al. | 264/3.1 |
| 4,429,634 | 2/1984 | Byrd et al. | 264/3.1 |
| 4,601,862 | 7/1986 | Byrd et al. | 264/3.1 |
| 4,744,299 | 5/1988 | Sayles | 102/290 |
| 4,803,019 | 2/1989 | Graham et al. | 264/3.1 |

*Primary Examiner*—Robert L. Stoll
*Assistant Examiner*—Daniel S. Metzmaier
*Attorney, Agent, or Firm*—Donald J. Singer; Charles E. Bricker

[57] ABSTRACT

Tooling for solid propellant casting consisting essentially of a shaped, filled polymer or copolymer article having an outer layer of cured polyvinyl butyral. The casting tooling is used extensively throughout the solid propellant industry to mold or form the solid propellant grain of rocket motors. The cured polyvinyl butyral layer provides improved mold release properties to the tooling.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOLD RELEASE TECHNIQUE FOR SOLID PROPELLANT CASTING TOOLING

RIGHTS OF THE GOVERNMENT

The invention described herein may be manufactured and used by or for the Government of the United States for all governmental purposes without the payment of any royalty.

BACKGROUND OF THE INVENTION

This invention relates to tooling which is employed in the casting of solid rocket propellants.

A solid propellant rocket generally employs a rocket motor case, insulation, a liner composition, and a solid propellant grain in the order listed as viewed from the outer motor case to the solid propellant grain contained therein. The functions of each of the components of a solid propellant rocket motor are well defined in the art.

The solid propellant grain may be processed by extrusion or casting techniques. The majority of modern composite propellants for rocket motors are cast directly into the case as a cross-linkable mixture and cured in place.

The thrust-time characteristic of a solid propellant rocket can be controlled by the geometric shape of the grain. Neutral burning grains maintain a constant surface during burning and produce a constant thrust. Progressive burning grains increase in surface during burning and produce an increasing thrust with time. Regressive burning grains decrease in surface during burning and produce a decreasing thrust with time.

The geometric shape of a grain is generally understood to be the shape of the internal perforation or perforations. Internally perforated, outwardly burning grains are superior to end burning or external burning grains because the wall area of the motor case is protected from the hot gas generated by combustion.

The perforation in a cast solid propellant grain is produced by casting the cross-linkable mixture around shaped casting tooling, curing the mixture and withdrawing the tooling from the cured solid propellant. Glass-filled polytetrafluoroethylene casting tooling is used extensively throughout the solid propellant industry to mold or form the solid propellant grain of rocket motors. From both the safety and design standpoints, it is an ideal material of construction. It is a relatively soft material with a low compressive strength, yet is dimensionally stable. Unfortunately, the mold release properties of this material are reduced as glass filler is added. The mold release properties also degrade with repeated use, because mobile propellant species migrate into the porous glass-filled polymer substrate. Conventional mold release agents are ineffective with this tooling since they are not impervious and allow species migration into the glass-filled polymer substrate. Conventional cleaning methods are also ineffective since they do not remove subsurface contamination. Thus, repeated usage of glass-filled polytetrafluoroethylene casting tooling results in removal difficulties and damage to the propellant grain in the form of surface tears.

Accordingly, it is an object of this invention to provide a method for modifying solid propellant casting tooling to provide improved mold release.

It is another object of this invention to provide improved solid propellant casting tooling.

Other objects, aspects and advantages of the present invention will become apparent to those skilled in the art from a reading of the following detailed description of the invention.

SUMMARY OF THE INVENTION

In accordance with the present invention, there is provided improved solid propellant casting tooling consisting essentially of a shaped, filled polymer or copolymer article having at least one outer layer of cured polyvinyl butyral.

There is also provided a method for modifying solid propellant casting tooling consisting essentially of a shaped, filled polymer or copolymer article to provide improved mold release, which consists essentially of applying at least one outer coating of polyvinyl butyral to the shaped article and curing the same.

DESCRIPTION OF THE PREFERRED EMBODIMENT

The improved solid propellant casting tooling of this invention consists essentially of a shaped, filled polymer or copolymer article having an outer layer of cured polyvinyl butyral. As mentioned previously, this tooling is used extensively throughout the solid propellant industry to mold or form the solid propellant grain of rocket motors. The polymer is commonly a fluorinated alkylene polymer or copolymer, such as polytetrafluoroethylene (PTFE), although other polymeric materials, such as polyethylene, polypropylene, polyvinyl chloride and the like, which are rendered porous by the addition of filler materials, may also be used. The filler may be glass fibers, carbon black, synthetic fibers and the like, including mixtures thereof. The fabrication of such tooling is not a part of the present invention.

Polyvinyl butyral resins may be prepared from vinyl acetate according to the following steps: (a) polymerization of vinyl acetate monomer into polyvinyl acetate; (b) partial hydrolysis of polyvinyl acetate to polyvinyl alcohol; (c) reaction of polyvinyl alcohol with n-butyraldehyde to produce polyvinyl butyral/acetate resin. Polyvinyl butyral resins are commercially available from several commercial sources, such as, Monsanto Chemical Co., Union Carbide Co., etc. Three such resins available under the tradename Butvar (Monsanto Chemical Co.) have the compositions (designation/vinyl alcohol content (wt %)/vinyl acetate content (wt%)/vinyl butyral content (wt %)/approximate molecular wt): B-72A/19/1.0/80/3500; B-76/11/1.0/88/750; B-98/19/1.0/80/500.

At least one, preferably at least 3, layers of polyvinyl butyral resin are applied to the outer surface of the casting tooling. The resin can be applied using any conventional technique, such as dipping, spraying, brushing, etc. Sufficient time should be allowed between each layer for the carrier solvent to substantially completely evaporate. The resin coating is cured by heating to about 100° to 140° F. for about 8 to 48 hours. Previously used tooling should be lightly abraded prior to application of the resin.

For use with electrostatic-sensitive propellants, the resin coating and/or the filled polymer or copolymer tooling can be rendered conductive by incorporating therein a conducting ingredient, such as carbon black.

The polyvinyl butyral coating lacks mold release properties. Accordingly, prior to using the improved tooling of this invention for casting a propellant grain, a conventional mold release agent is applied to the outer surface.

The following Examples illustrate the invention. Mold release rods were 1-inch diameter, 5-inch long rods of 25% glass-filled Teflon ®. Four coats of polyvinyl butyral (Butvar B-98, Monsanto Chemical Co.) were brushed on the rods with one hour between coats to allow the solvent to evaporate. The thus-coated rods were heated at 120° F for 24 hours to cure the resin coat. A top coat of a conventional fluorocarbon dispersion (Miller-Stephenson Chemical Co., MS-122) was applied to the resin coated rods.

In the tests which follow, glass-filled Teflon rods, without the polyvinyl butyral coating, and with and without the fluorocarbon dispersion coating, were used for comparison.

The mold release rods were placed in cups and deaerated propellant was placed in the cups around the rods. The propellant was cured and the rods were removed from the cured propellant using an Instron tensile testing machine.

EXAMPLE I

The mold release rods were cast into an 88% solids HTPB/Al/AP composite propellant. The propellant was cured for 15 days at 120° F. A summary of the mold release properties is presented in Table I, below:

TABLE I

| Set | Coating(s) | Shear Stress (psi) n* | Mean | Std. Dev. |
|---|---|---|---|---|
| 1 | None | 4 | 32.8 | 1.3 |
| 2 | 1 fluorocarbon | 4 | 36.5 | 2.9 |
| 3 | 4 polyvinyl butyral 1 fluorocarbon | 12 | 23.5 | 0.9 |

*number of samples in set.

Examination of the above data reveals that the uncoated glass-filled Teflon rods in Set 1 released with an average shear stress of 32.8 psi. The addition of one coat of fluorocarbon release agent (set 2) was ineffective, with an average release shear stress of 36.5 psi. In contrast, the rods coated with 4 coats of polyvinyl butyral and one coat of fluorocarbon release agent (set 3) had an average shear stress of 23.5 psi, an improvement of about 28% in mold release properties over the uncoated glass-filled Teflon rods.

EXAMPLE II

The mold release rods were cast into an 88.1% solids HTPB/AP composite propellant. The propellant was cured for 10 days at 135° F. A summary of the mold release properties is presented in Table II, below:

TABLE II

| Set | Coating(s) | Shear Stress (psi) n | Mean | Std. Dev. |
|---|---|---|---|---|
| 4 | None | 4 | 25.8 | 1.5 |
| 5 | 1 fluorocarbon | 4 | 26.9 | 1.1 |
| 6 | 4 polyvinyl butyral 1 fluorocarbon | 12 | 18.5 | 1.9 |

Examination of the above data reveals that the rods coated with 4 coats of polyvinyl butyral and one coat of fluorocarbon release agent (set 6) had an average shear stress of 18.5 psi, an improvement of about 28% in mold release properties over the uncoated glass-filled Teflon rods (set 4).

EXAMPLE III

The mold release rods were cast into a 75% solids NEPE/Al/HMX/AP crosslinked double base propellant. The propellant was cured for 5 days at 120° F. A summary of the mold release properties is presented in Table III, below:

TABLE III

| Set | Coating(s) | Shear Stress (psi) n | Mean | Std. Dev. |
|---|---|---|---|---|
| 7 | None | 4 | 46.5 | 4.8 |
| 8 | 1 fluorocarbon | 4 | 34.0 | 2.0 |
| 9 | 4 polyvinyl butyral 1 fluorocarbon | 12 | 23.2 | 1.9 |

Examination of the above data reveals that the rods coated with 4 coats of polyvinyl butyral and one coat of fluorocarbon release agent (set 9) had an average shear stress of 23.2 psi, an improvement of about 50% in mold release properties over the uncoated glass-filled Teflon rods (set 7).

EXAMPLE IV

The mold release rods were coated with 2 or 4 coats of polyvinyl butyral, and 1 or 2 coats of a fluorocarbon mold release agent and cast into an 88% solids HTPB/Al/AP composite propellant. The propellant was cured for 15 days at 120° F. A summary of the mold release properties is presented in Table IV, below:

TABLE IV

| Set | Coating(s) | Shear Stress (psi) n | Mean | Std. Dev. |
|---|---|---|---|---|
| 10 | None | 3 | 38.2 | 2.7 |
| 11 | 1 fluorocarbon | 3 | 34.7 | 2.4 |
| 12 | 2 fluorocarbon | 3 | 30.4 | 2.6 |
| 13 | 2 polyvinyl butyral 1 fluorocarbon | 9 | 26.1 | 0.8 |
| 14 | 2 polyvinyl butyral 2 fluorocarbon | 3 | 23.5 | 0.3 |
| 15 | 4 polyvinyl butyral 1 fluorocarbon | 3 | 24.2 | 0.9 |
| 16 | 4 polyvinyl butyral 2 fluorocarbon | 9 | 23.3 | 0.8 |

Examination of the above data reveals that the rods coated with 1 or 2 coats of fluorocarbon release agent (sets 11 and 12, respectively) reduced mold release requirements by about 10 and 20%, respectively, over the uncoated glass-filled Teflon rods (set 10). The addition of 2 coats of polyvinyl butyral and one coat of fluorocarbon release agent (set 13) provided an improvement of about 30% as compared to the uncoated rods (set 10). The addition of 2 coats of polyvinyl butyral and 2 coats of fluorocarbon release agent (set 14) or 4 coats of polyvinyl butyral and 1 or 2 coats of fluorocarbon release agent (sets 15 and 16, respectively), reduced the mold release requirements by about 40%.

EXAMPLE V

The polyvinyl butyral-coated rods from examples I, II and III (sets 3, 6 and 9) were cleaned of residual propellant using methyl chloroform. The polyvinyl butyral was undisturbed with this cleaning. The fluorocarbon mold release agent was freshly applied. The refurbished rods were cast into the same propellants, cured and the rods removed. A summary of the mold release properties is presented in Table V, below:

TABLE V

| Set | Propellant | Shear Stress (psi) 1st use | 2nd use | 3d use |
|---|---|---|---|---|
| 3A | HTPB/Al/AP | 23.5 | 25.9 | 26.3 |
| 6A | HTPB/AP | 18.5 | 20.0 | 16.1 |
| 9A | NEPE/Al/HMX/AP | 23.2 | 22.4 | 17.8 |

Examination of the above data reveals that the refurbished rods retain their improved mold release properties through 3 complete cycles.

EXAMPLE VI

The mold release rods were coated with two coats of polyvinyl butyral containing 7% carbon. This coating had a measured surface resistivity of $1.0 \times 10^5$ ohms. One coat of fluorocarbon mold release agent was applied and the rods were cast into a 88% solids HTPB/Al/AP composite propellant. The propellant was cured for 15 days at 120° F. A summary of the mold release properties is presented in Table VI, below:

TABLE VI

| Set | Coating(s) | Shear Stress (psi) n | Mean | Std. Dev. |
|---|---|---|---|---|
| 17 | None | 3 | 38.2 | 2.7 |

TABLE VI-continued

| Set | Coating(s) | Shear Stress (psi) n | Mean | Std. Dev. |
|---|---|---|---|---|
| 18 | 2 polyvinyl butyral** 1 fluorocarbon | 3 | 21.9 | 5.3 |

**with 7% carbon.

Examination of the above data reveals that the rods coated with 2 coats of polyvinyl butyral with 7% carbon and one coat of fluorocarbon release agent (set 18) had an average shear stress of 21.9 psi, an improvement of about 43% in mold release properties over the uncoated glass-filled Teflon rods.

Various modifications may be made to the invention as described without departing from the spirit of the invention or the scope of the appended claims.

We claim:

1. Tooling for solid propellant casting consisting essentially of a shaped, filled polymer or copolymer article having at least one outer layer of cured polyvinyl butyral.

2. The tooling of claim 1 wherein said shaped, filled article is polytetrafluoroethylene.

3. The tooling of claim 2 wherein said shaped, filled article contains about 25% glass filler.

4. The tooling of claim 2 wherein said polyvinyl butyral layer contains carbon black.

5. The tooling of claim 4 wherein said polyvinyl butyral layer contains about 7% carbon black.

* * * * *